United States Patent [19]
Matamoros et al.

[11] Patent Number: 6,161,109
[45] Date of Patent: *Dec. 12, 2000

[54] ACCUMULATING CHANGES IN A DATABASE MANAGEMENT SYSTEM BY COPYING THE DATA OBJECT TO THE IMAGE COPY IF THE DATA OBJECT IDENTIFIER OF THE DATA OBJECT IS GREATER THAN THE IMAGE IDENTIFIER OF THE IMAGE COPY

[75] Inventors: Deborah A. Matamoros, San Jose; James Alan Ruddy, Gilroy, both of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/061,589

[22] Filed: Apr. 16, 1998

[51] Int. Cl.⁷ .................................................. G06F 17/00

[52] U.S. Cl. ......................... 707/203; 707/101; 707/102

[58] Field of Search ........................................ 707/1–206

[56] References Cited

U.S. PATENT DOCUMENTS

| | | |
|---|---|---|
| 5,043,871 | 8/1991 | Nishigaki et al. . |
| 5,151,987 | 9/1992 | Abraham et al. ........................ 395/575 |
| 5,455,944 | 10/1995 | Haderle et al. . |
| 5,455,946 | 10/1995 | Mohan et al. . |
| 5,548,750 | 8/1996 | Larsson et al. . |
| 5,553,279 | 9/1996 | Goldring . |
| 5,559,991 | 9/1996 | Kanfi . |
| 5,594,900 | 1/1997 | Cohn et al. . |
| 5,642,496 | 6/1997 | Kanfi . |
| 5,768,582 | 6/1998 | Korenshtein ............................. 707/203 |
| 5,799,322 | 8/1998 | Mosher, Jr. ............................. 707/201 |
| 5,864,849 | 1/1999 | Bohannon et al. ......................... 707/7 |
| 5,900,000 | 5/1999 | Korenshtein ............................. 707/202 |
| 5,909,689 | 6/1999 | Van Ryzin ............................... 707/202 |

FOREIGN PATENT DOCUMENTS 991022  8/1961  United Kingdom .

OTHER PUBLICATIONS

Nunamaker et al., "Object databases for SGML document management" Abstract, System Sciences, Proceedings of the Thirtieth Hawaii International Conference, 1997.

Nielson et al., "Digital object identifiers and their role in the implementation of electronic publishing" Abstract, Socio-economic Dimensions of Electronic Publishing Workshop, Proceedings, Apr. 1998.

Benevento et al., "Consistency checking in complex object database schemata with integrity constraints" Abstract, Knowledge and Data Engineering, IEEE Transactions, Aug. 1998.

R.A. Crus, et al., "Incremental Data Base Log Image Copy", IBM Technical Disclosure Bulletin, vol. 25, No. 7B, pp. 3730–3732, Dec. 1982.

R.A. Crus, "Data Recovery in IBM Database 2", IBM Systems Journal, vol. 23, No. 2, pp. 178–188, 1984.

"Restoring Data From DASD Volumes Having Hardware Errors", IBM Technical Disclosure Bulletin, vol. 31, No. 7, pp. 313–317, Dec. 1988.

*Primary Examiner*—Thomas G. Black
*Assistant Examiner*—David Jung
*Attorney, Agent, or Firm*—Pretty, Schroeder & Poplawski, P.C.

[57] ABSTRACT

A method, apparatus, and article of manufacture for a computer implemented image copying system for identifying modifications in a database in a computer. The database contains data objects and is stored on a primary data storage device connected to the computer. A data object identifier is generated for each data object as the data object is modified. An image identifier is generated for an image copy of the database when the image copy is updated, wherein the image copy is stored on a secondary data storage device. When one or more data objects are to be copied from the primary data storage device to the secondary data storage device, the data objects to be copied are determined by comparing the data object identifier of each data object to the image identifier.

21 Claims, 5 Drawing Sheets

ACCUMULATING CHANGES IN A DATABASE MANAGEMENT SYSTEM BY COPYING THE DATA OBJECT TO THE IMAGE COPY IF THE DATA OBJECT IDENTIFIER OF THE DATA OBJECT IS GREATER THAN THE IMAGE IDENTIFIER OF THE IMAGE COPY

BACKGROUND OF THE INVENTION

1. Field of the Invention

This invention relates in general to computer-implemented database systems, and, in particular, to accumulating changes in a database management system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

A table is assigned to a tablespace. The tablespace contains one or more datasets. In this way, the data from a table is assigned to physical storage on DASD. Each tablespace is physically divided into equal units called pages. The size of the tablespace's pages is based on the page size of the bufferpool specified in the tablespace's creation statement. The bufferpool is an area of virtual storage that is used to store data temporarily. A tablespace can be partitioned, in which case a table may be divided among the tablespace's partitions, with each partition stored as a separate dataset. Partitions are typically used for very large tables.

A table may have an index. An index is an ordered set of pointers to the data in the table. There is one physical order to the rows in a table that is determined by the RDBMS software, and not by a user. Therefore, it may be difficult to locate a particular row in a table by scanning the table. A user creates an index on a table, and the index is based on one or more columns of the table. A partitioned table must have at least one index. The index is called the partition index and is used to define the scope of each partition and thereby assign rows of the table to their respective partitions. The partition indexes are created in addition to, rather than in place of, a table index. An index may be created as UNIQUE so that two rows can not be inserted into a table if doing so would result in two of the same index values. Also, an index may be created as a CLUSTERING index, in which case the index physically stores the rows in order according to the values in the columns specified as the clustering index (i.e., ascending or descending, as specified by the user).

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables interactively, in batch files, or embedded in host languages, such as C and COBOL. SQL allows the user to manipulate the data. As the data is being modified, all operations on the data are logged in a log file.

One technique for recovering a database involves restoring a prior full image copy of the data and then reapplying subsequent logged changes to make the data current in time. Typically, the database containing partitions and indexes is stored on a data storage device, called a primary data storage device. The partitions are periodically copied to another data storage device, called a secondary data storage device, for recovery purposes. In particular, the partitions stored on the primary data storage device may be corrupted, for example, due to a system failure during a flood, or a user may want to remove modifications to the data (i.e., back out the changes). In either case, for recovery, the partitions are typically copied from the secondary data storage device to the primary data storage device. Next, using the log file, the copied data is modified based on the operations in the log file. Then, the indexes are rebuilt. In particular, to rebuild the indexes, keys are copied from each row of each partition, sorted, and then used to create a partition index. Additionally, the table index is rebuilt based on the partition indexes.

Another technique for recovering a database involves restoring the database using a prior full image copy, restoring one or more partial image copies (sometimes called incremental copies), and then reapplying subsequent logged changes to make the data current in time. The partial copies contain accumulated changes made to the data since the previous full or partial image copy operation. In some systems, the changed data is identified using indicators (i.e., usually called "dirty" bits or "status" bits) associated with each record or block of records (i.e., sometimes called a "page" of records) to designate that a change has occurred to a record or block. Whenever the record or block is first modified, the indicator is set. Each time the record or block is placed in an image copy, the indicator is reset. However, the overhead of maintaining these indicators is significant. With high transaction loads in a data sharing complex, providing coherency of these indicators across the records and blocks of the complex can result in degraded transaction and system performance.

These techniques for recovery of data are very costly in terms of performance. Additionally, users are not able to access data while recovery is taking place. For a user or company requiring the use of computers to do business, much money can be lost during recovery. Therefore, it is important to improve the efficiency of the recovery process, and there is a need in the art for an improved recovery technique without the need for changed data indicators (i.e., "status" bits).

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented image copying system for identifying modifications in a database in a computer.

In accordance with the present invention, the database contains data objects and is stored on a primary data storage device connected to the computer. A data object identifier is generated for each data object as the data object is modified. An image identifier is generated for an image copy of the database when the image copy is updated, wherein the image copy is stored on a secondary data storage device. When one or more data objects are to be copied from the primary data storage device to the secondary data storage device, the data objects to be copied are determined by comparing the data object identifier of each data object to the image identifier.

An object of the invention is to provide an improved image copying system for a database. Another object of the invention is to identify modifications in the database. Yet another object of the invention is to provide a technique for accumulating changes in a database without the use of status bits.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
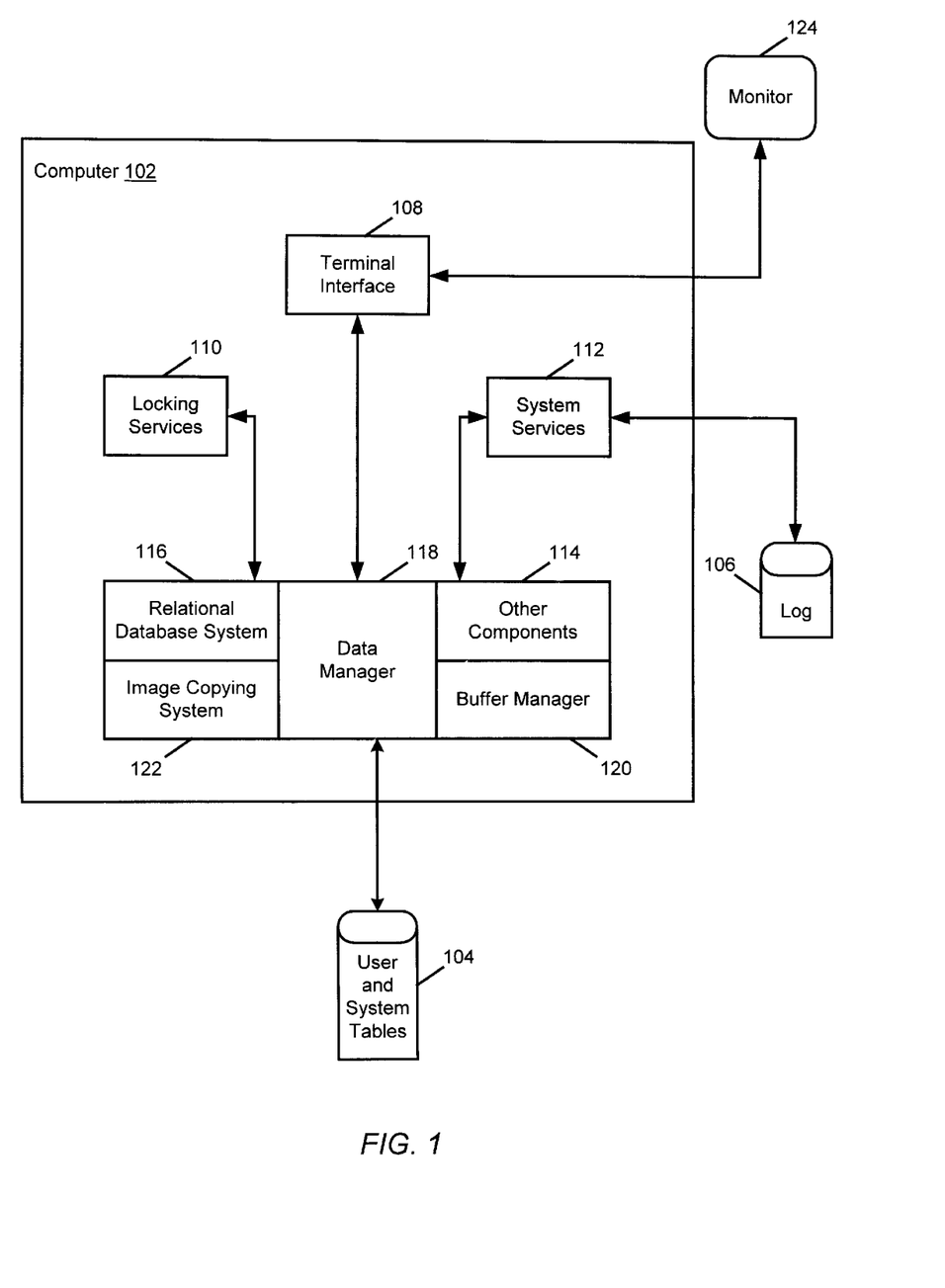
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2® product offered by IBM for the MVS® or OS/390® operating systems. Those skilled in the art will recognize, however, that the present invention has application to any RDBMS software that uses SQL.

As illustrated in FIG. 1, the DB2® architecture for the MVS® operating system includes three major components: the Internal Resource Lock Manager (IRLM) 110, the Systems Services module 112, and the Database Services module 114. The IRLM 110 handles locking services for the DB2® architecture, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Buffer Manager 120, the Image Copying System 122, and other components 124, such as an SQL compiler/interpreter. These submodules support the functions of the SQL language, i.e. definition, access control, interpretation, compilation, database retrieval, and update of user and system data. The Image Copying System 122 works with the components of the computer system 102 to restore a database.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 124 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, cause the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Accumulating Changes in a Database Management System

The image copying system 122 in conjunction with the data manager 118 provides a technique for determining which data from a database has been modified and should be copied from an "original" or "primary" copy on a primary data storage device to update an "image" or "secondary" copy on a secondary data storage for use as a backup copy device. The image copying system 122 is able to make the determination without the use of "status" bits. The image copying system 122 delays the need to determine whether a record or block has been updated until the time at which image copies are being made. Additionally, the image copying system 122 preferably makes the determination using log sequence numbers (LSNs).

Figure 2:
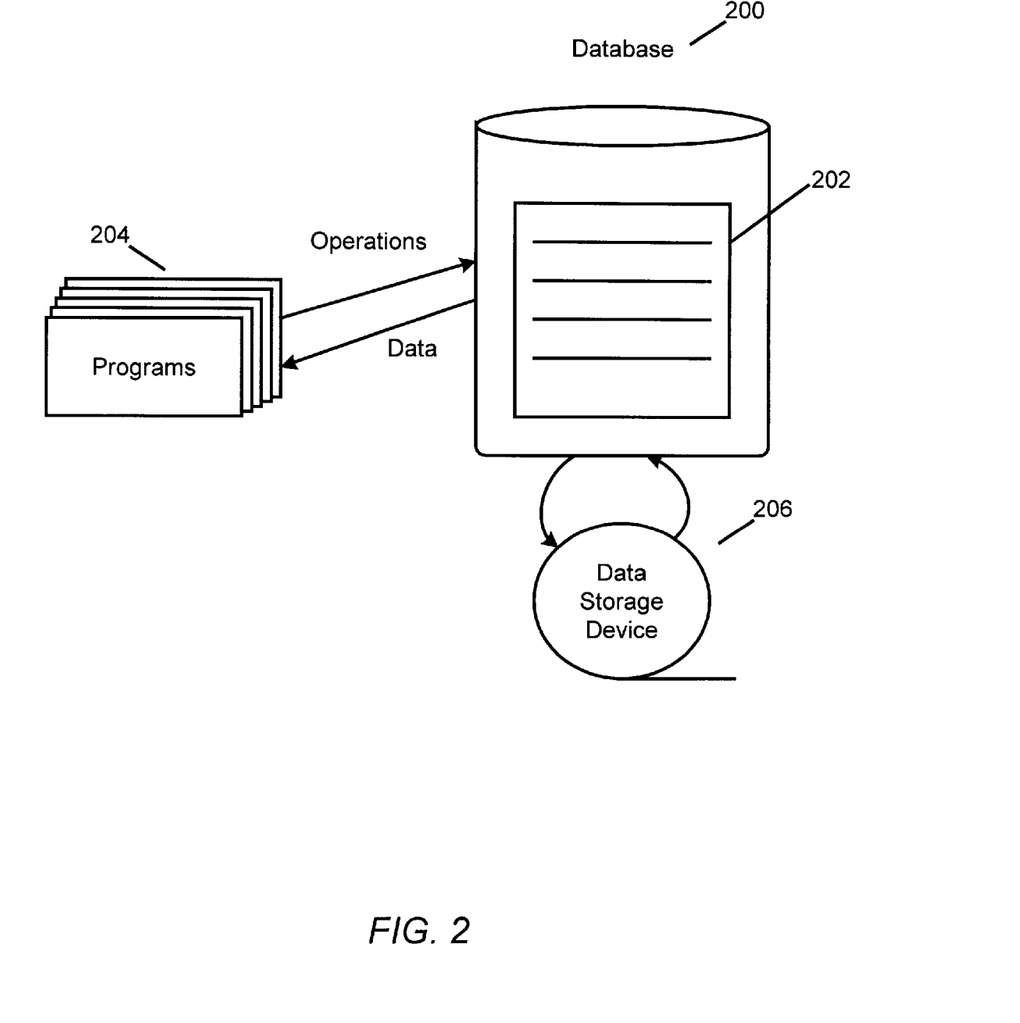
FIG. 2 illustrates a sample database and its image copy that could be used in accordance with the present invention.

FIG. 2 illustrates a sample database and its image copy that could be used in accordance with the present invention. The database 200 is stored on a primary data storage device. The database 200 contains "data objects" 202 (e.g., records or blocks). Application programs 204 modify the database 200 by adding, updating, or deleting data via operations. These modifications are logged in a log file. Periodically, the database 200 or a portion of the database 200 is copied to a secondary data storage device 206. A full image copy involves copying all of the data in the database 200 to the secondary data storage device 206. A partial image copy involves copying data that has been modified since the last copy operation to the secondary data storage device 206. The image copying system 122 makes a determination at the time of making a copy of which data has been modified since the last copy was made. The image copying system 122 makes this determination by using log sequence numbers or comparable means, for example, a timestamp or other indicator of the sequence of the modifications in time relative to backup copies and partial copies. Each log sequence number relates to a point in time and is used to indicate which of two data objects was modified most recently. The log sequence number is typically a monotonically increasing number.

For example, if a record stored in the database had been modified after the last image copy of the database had been taken, then the record needs to be copied to the image copy. On the other hand, if the record stored in the database had been modified prior to the last image copy that had been taken, then there is no need to copy that record to the image copy.

The image copying system 122 and data manager 118 make use of a "global log sequence number" ("global LSN"), which is described in further detail in U.S. Pat. No. 5,455,946, entitled "Method and Means For Archiving Modifiable Pages in a Log Based Transaction Management System", issued Oct. 3, 1995, to Mohan, et al., [hereinafter "Mohan, et al."], which is incorporated by reference herein. The global LSN is an increasing value that relates to a point in time. The global LSN indicates the difference between LSN numbers relative to that point in time.

A data LSN is assigned to each record, block, or other data object, depending on the storage structure of the database. The data LSN is obtained from the global LSN. In particular, when a record or block is modified, the data LSN for that record or block is updated to match the most recent global LSN. When a global LSN is used in this manner, the global LSN is incremented. Unlike the technique described in Mohan et al., the image copying system 122 does not require updating of the "status bits".

Figure 3:
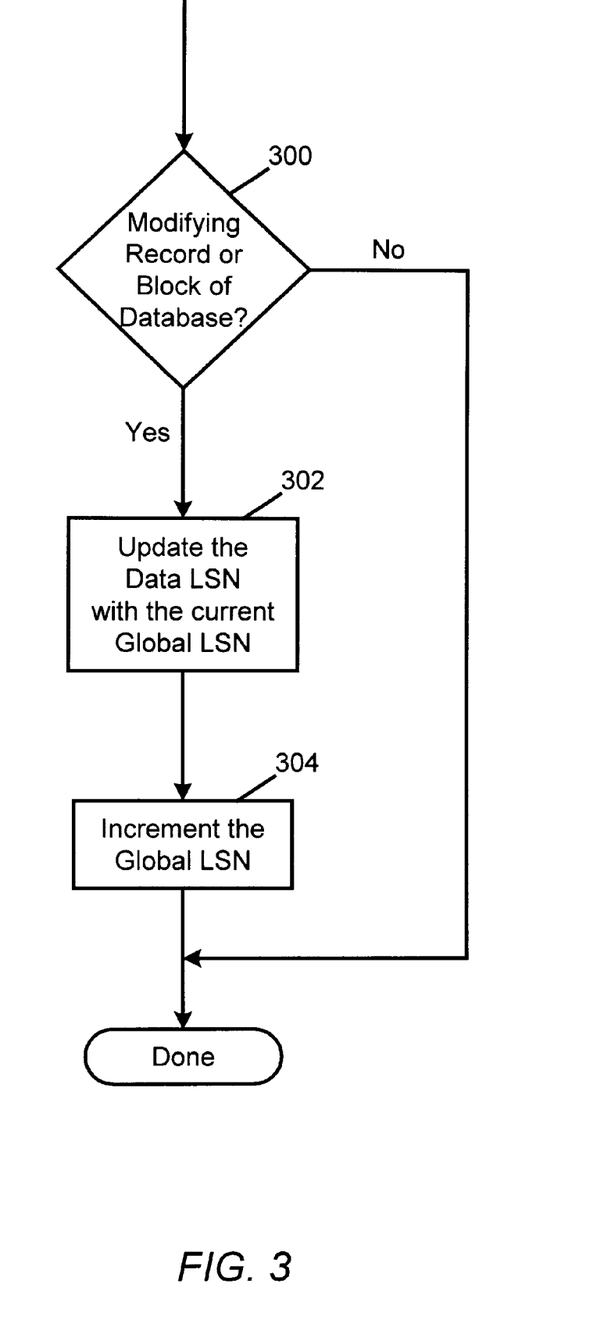
FIG. 3 is a flow diagram indicating the steps performed by the data manager system when modifying data in the database in accordance with the present invention.

FIG. 3 is a flow diagram indicating the steps performed by the data manager 118 when modifying data in the database in accordance with the present invention. In Block 300, the data manager 118 determines whether a record or block of the database is being modified. When a record or block is being modified, the data manager 118 continues to Block 302, otherwise, the data manager 118 has finished this processing. In Block 302, the data manager 118 updates the data LSN for the record or block with the global LSN. In Block 304, the data manager 118 increments the global LSN.

Additionally, an image copy backup LSN ("ICBU LSN") is assigned to the image copy. The image copying system 122 records an initial ICBU LSN in the image copy and in a system catalog. The ICBU LSN is also based on the global LSN. At the time a record or block is copied, the ICBU LSN for the entire copy (i.e., not just for a particular record or block) is updated to match the most recent global LSN. When a global LSN is used in this manner, the global LSN is incremented.

Image copies can be made for the entire database (i.e., full image copy) or for parts of it (i.e., partial image copy). A full image copy will update the ICBU LSN in the ICBU data and in the system catalog with the current global LSN.

A partial image copy will determine the set of changed records or blocks as those records or blocks whose data LSNs are greater than or later in time to the ICBU LSN. The ICBU LSN is acquired from the ICBU data or system catalog. Then, the partial image copy accumulates that set of changed data records or blocks in the partial image copy and updates the ICBU LSN in the data and the system catalog.

The technique for determining the modified data involves reading each record or block. The image copying system 122 determines which records or blocks have been modified and are to be copied to the image copy by comparing the data LSN of each record or block to the ICBU LSN of the most recent full or partial image copy. The data LSN corresponds to the record or block being read. The ICBU LSN comes from the one LSN maintained for the ICBU, which identifies the point in time that a copy was last made. Then, if the data LSN is greater than the ICBU LSN, the record or block is copied to the image copy. When the data LSN is greater than the ICBU LSN, the image copying system 122 determines that the data has been changed subsequent to the last image copy that had been taken and is to be accumulated in a current partial image copy operation.

The image copying system 122 delays the comparison of the data LSN and the ICBU LSN to the time at which copying is to be performed. On the other hand, the technique described in Mohan et al. performs the comparison prior to the time copying is to be performed (i.e., at the time modifications are made) and sets "status" bits to indicate which data has been modified.

Figure 4:
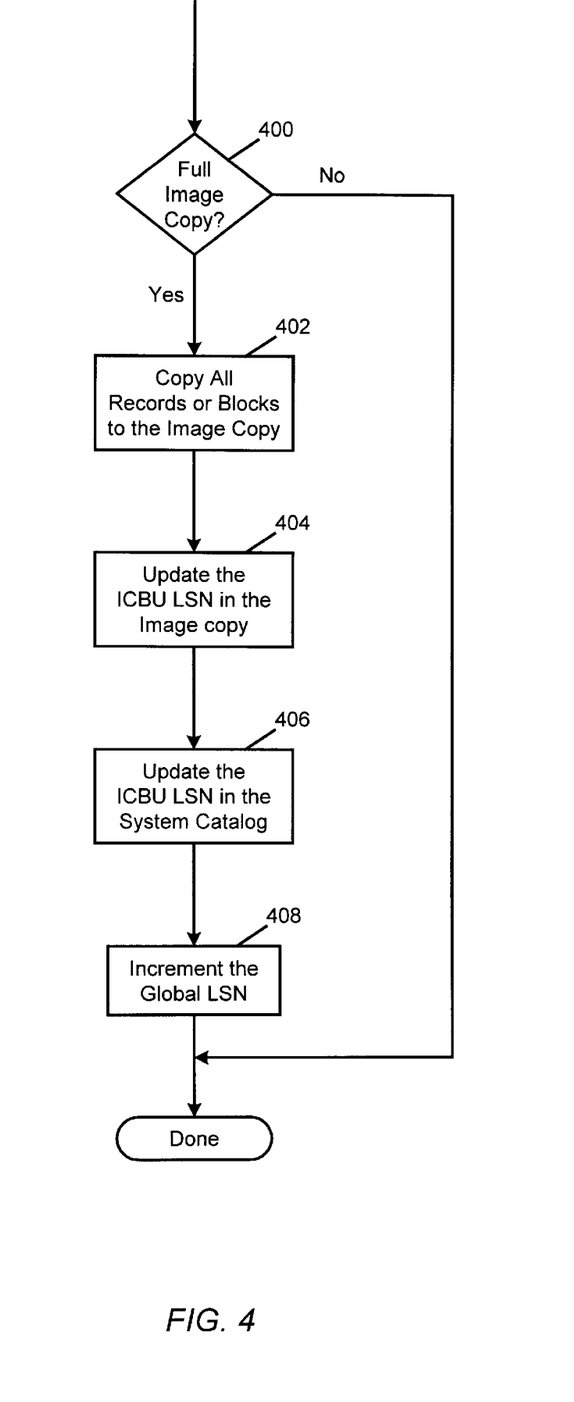
FIG. 4 is a flow diagram illustrating the steps performed by the image copying system to make a full image copy in accordance with the present invention.

FIG. 4 is a flow diagram illustrating the steps performed by the image copying system 122 to make a full image copy in accordance with the present invention. In Block 400, the image copying system 122 determines whether a full image copy is to be made. If a full image copy is to be made, the image copying system 122 continues to Block 402, otherwise, the image copying system 122 has finished this processing. In Block 402, the image copying system 122 copies all records or blocks to the image copy from the primary data storage device to the secondary data storage device. In Block 404, the image copying system 122 updates the ICBU LSN in the image copy. In Block 406, the image copying system 122 updates the ICBU LSN in the system catalog. In Block 408, the image copying system 122 increments the global LSN.

Figure 5:
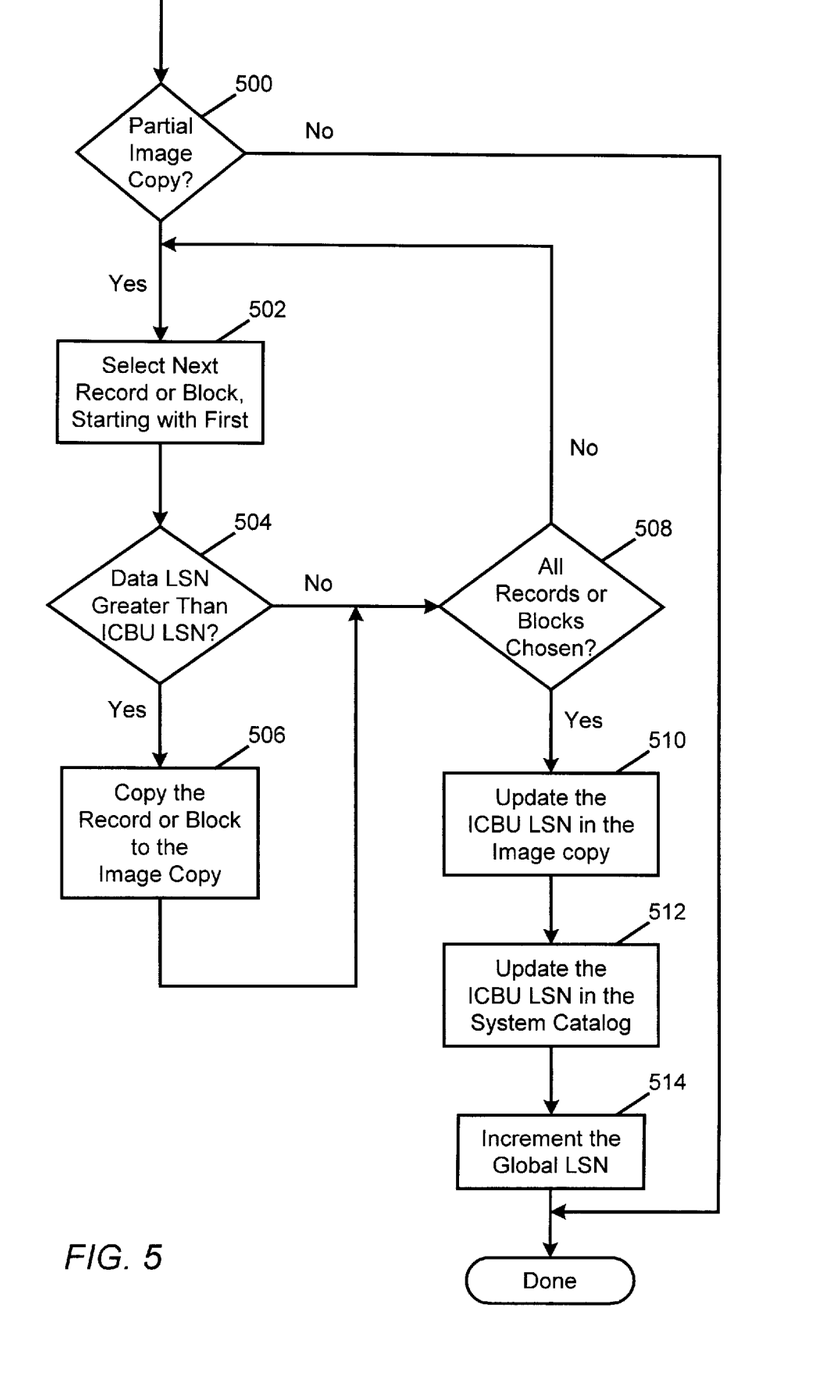
FIG. 5 is a flow diagram illustrating the steps performed by the image copying system to make a partial image copy in accordance with the present invention.

FIG. 5 is a flow diagram illustrating the steps performed by the image copying system 122 to make a partial image copy in accordance with the present invention. In Block 500, the image copying system 122 determines whether a partial image copy is to be made. If a partial image copy is to be made, the image copying system 122 continues to Block 502, otherwise the image copying system 122 has finished this processing. In Block 502, the image copying system 122 selects the next record or block, starting with the first. In Block 504, the image copying system 122 determines whether the data LSN of the selected record or block is greater than the ICBU LSN. If the data LSN is greater, the image copying system 122 continues to Block 506, otherwise, the image copying system 122 continues to Block 508.

In Block 506, the image copying system 122 copies the selected record or block from the original copy to the image copy. In Block 508, the image copying system 122 determines whether all records or blocks have been chosen. If all records have been chosen, the image copying system 122 continues to Block 510, otherwise, the image copying system 122 loops back to Block 502 to select the next record or block.

In Block 510, the image copying system 122 updates the ICBU LSN in the image copy. In Block 512, the image copying system 122 updates the ICBU LSN in the system catalog. In Block 514, the image copying system 122 increments the global LSN.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented image copying system. The present invention provides an improved image copying system for a database. The present invention also identifies modifications in the database. Moreover, the present invention provides a technique for accumulating changes in a database without the use of status bits.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of identifying modifications in a database in a computer, the database containing data objects and being stored on a primary data storage device connected to the computer, the method comprising the steps of:

generating a different data object identifier for each data object as the data object is modified, wherein the data object identifier reflects when the data object is modified;

generating a different image identifier for an image copy of the database when the image copy is updated, wherein the image identifier reflects when the image copy is updated, and wherein the image copy is stored on a secondary data storage device; and when one or more data objects are to be copied from the primary data storage device to the secondary data storage device, only comparing the data object identifier to the image identifier and, if the data object identifier of the data object is greater than the image identifier of the image copy, copying the data object to the image copy.

2. The method of claim 1, wherein a data object is a record of the database.

3. The method of claim 1, wherein a data object is a block of records of the database.

4. The method of claim 1, wherein the data object identifier is based on a global sequence number.

5. The method of claim 1, wherein the image identifier is based on a global sequence number.

6. The method of claim 1, further comprising:

determining that a full image copy is to be made;

copying each data object in the database from the primary data storage device to the image copy on the secondary data storage device;

updating the image identifier of the image copy on the secondary data storage device; and updating the image identifier of the image copy in a system catalog.

7. The method of claim 1, further comprising the step of determining that a partial image copy is to be made.

8. An apparatus for identifying modifications in a database, comprising:

a computer having a primary data storage device connected thereto, wherein the primary data storage device stores the database which contains data objects;

one or more computer programs, performed by the computer, for generating a different data object identifier for each data object as the data object is modified, wherein the data object identifier reflects when the data object is modified, generating a different image identifier for an image copy of the database when the image copy is updated, wherein the image identifier reflects when the image copy is updated, and wherein the image copy is stored on a secondary data storage device, and when one or more data objects are to be copied from the primary data storage device to the secondary data storage device, only comparing the data object identifier to the image identifier and, if the data object identifier of the data object is greater than the image identifier of the image copy, copying the data object to the image copy.

9. The apparatus of claim 8, wherein a data object is a record of the database.

10. The apparatus of claim 8, wherein a data object is a block of records of the database.

11. The apparatus of claim 8, wherein the data object identifier is based on a global sequence number.

12. The apparatus of claim 8, wherein the image identifier is based on a global sequence number.

13. The apparatus of claim 8, further comprising:

means for determining that a full image copy is to be made;

means for copying each data object in the database from the primary data storage device to the image copy on the secondary data storage device;

means for updating the image identifier of the image copy on the secondary data storage device; and means for updating the image identifier of the image copy in a system catalog.

14. The apparatus of claim 8, further comprising the means for determining that a partial image copy is to be made.

15. An article of manufacture comprising a computer program carrier readable by a computer and embodying one or more instructions executable by the computer to perform method steps for identifying modifications in a database, the database containing data objects and being stored on a primary data storage device connected to the computer, the method comprising the steps of:

generating a different data object identifier for each data object as the data object is modified, wherein the data object identifier reflects when the data object is modified;

generating a different image identifier for an image copy of the database when the image copy is updated, wherein the image identifier reflects when the image copy is updated, and wherein the image copy is stored on a secondary data storage device; and when one or more data objects are to be copied from the primary data storage device to the secondary data storage device, only comparing the data object identifier to the image identifier and, if the data object identifier of the data object is greater than the image identifier of the image copy, copying the data object to the image copy.

16. The article of manufacture of claim 15, wherein a data object is a record of the database.

17. The article of manufacture of claim 15, wherein a data object is a block of records of the database.

18. The article of manufacture of claim 15, wherein the data object identifier is based on a global sequence number.

19. The article of manufacture of claim 15, wherein the image identifier is based on a global sequence number.

20. The article of manufacture of claim 15, further comprising:

determining that a full image copy is to be made;

copying each data object in the database from the primary data storage device to the image copy on the secondary data storage device;

updating the image identifier of the image copy on the secondary data storage device; and updating the image identifier of the image copy in a system catalog.

21. The article of manufacture of claim 15, further comprising the step of determining that a partial image copy is to be made.

* * * * *